United States Patent
Lopez et al.

(10) Patent No.: US 10,735,230 B2
(45) Date of Patent: Aug. 4, 2020

(54) WIRELESS COMMUNICATION DEVICE, TRANSMITTER AND METHODS THEREIN

(71) Applicant: Telefonaktiebolaget LM Ericsson (publ), Stockholm (SE)

(72) Inventors: Miguel Lopez, Solna (SE); Bo Hagerman, Morristown, NJ (US); Dennis Sundman, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 85 days.

(21) Appl. No.: 16/300,418

(22) PCT Filed: Jul. 14, 2016

(86) PCT No.: PCT/SE2016/050714
§ 371 (c)(1),
(2) Date: Nov. 9, 2018

(87) PCT Pub. No.: WO2017/196220
PCT Pub. Date: Nov. 16, 2017

(65) Prior Publication Data
US 2019/0229960 A1 Jul. 25, 2019

Related U.S. Application Data

(60) Provisional application No. 62/335,771, filed on May 13, 2016.

(51) Int. Cl.
*H04L 27/20* (2006.01)
*H04B 1/00* (2006.01)
(Continued)

(52) U.S. Cl.
CPC ....... *H04L 27/2082* (2013.01); *H04B 1/0053* (2013.01); *H04B 1/406* (2013.01);
(Continued)

(58) Field of Classification Search
CPC ... H04B 1/0053; H04B 1/406; H04L 27/2014; H04L 27/0008; H04L 27/2017; H04L 27/2082; H04L 27/20
(Continued)

(56) References Cited

U.S. PATENT DOCUMENTS 7,869,409 B2   1/2011   Ivonnet et al.
8,948,230 B1   2/2015   Fan et al.
(Continued)

FOREIGN PATENT DOCUMENTS

CN    203014854 U   *   6/2013
WO    2003/088511 A1    10/2003

OTHER PUBLICATIONS

International Search Report and Written Opinion issued in International Application No. PCT/SE2016/050714, dated Feb. 8, 2017, 11 pages.
(Continued)

*Primary Examiner* — Rownak Islam
(74) *Attorney, Agent, or Firm* — Rothwell, Figg, Ernst & Manbeck, P.C.

(57) ABSTRACT

A transmitter in a first wireless communication device and method therein are disclosed. The transmitter comprises a modulator and a rate selector configured to select a data rate. The rate selector comprises an input configured to receive input bits and an output to provide the bits with the selected data rate. The transmitter further comprises a bit to symbol mapper configured to receive the bits from the rate selector and map the bits to symbols of an arbitrary alphabet. The transmitter further comprises a spreading unit configured to spread the symbols received from the bit to symbol mapper to a chip sequence by means of a spreading code. The transmitter further comprises a re-mapping unit configured to map the chip sequence received from the spreading unit to produce signals for providing to the modulator.

24 Claims, 10 Drawing Sheets

(51) Int. Cl.
*H04B 1/403* (2015.01)
*H04L 27/00* (2006.01)
(52) U.S. Cl.
CPC ...... *H04L 27/0008* (2013.01); *H04L 27/2014* (2013.01); *H04L 27/2017* (2013.01); *H04L 27/20* (2013.01)
(58) Field of Classification Search
USPC .......................................................... 370/329
See application file for complete search history.

(56) References Cited

U.S. PATENT DOCUMENTS

| | | | |
|---|---|---|---|
| 2005/0094711 A1* | 5/2005 | Miller ..................... | H04J 13/10 375/146 |
| 2006/0193402 A1 | 8/2006 | Lee | |
| 2008/0137570 A1 | 6/2008 | Min et al. | |
| 2008/0240167 A1 | 10/2008 | Ivonnet et al. | |
| 2018/0123636 A1* | 5/2018 | Safavi .................... | H04B 1/707 |
| 2019/0150117 A1* | 5/2019 | Lou ..................... | H04W 72/048 370/329 |

OTHER PUBLICATIONS

Laurent, "Exact and Approximate Construction of Digital Phase Modulations by Superposition of Amplitude Modulated Pulses (AMP)", IEEE Transactions on Communications, vol. Com-34, No. 2, Feb. 1986, (11 pages).
Russian Decision of Grant dated Aug. 2, 2019, issued in Russian Patent Application No. 2018144065. (17 pages).

* cited by examiner

WIRELESS COMMUNICATION DEVICE, TRANSMITTER AND METHODS THEREIN

CROSS REFERENCE TO RELATED APPLICATION(S)

This application is a 35 U.S.C. § 371 National Stage of International Patent Application No. PCT/SE2016/050714, filed Jul. 14, 2016, designating the United States and claiming priority to U.S. provisional application No. 62/335,771, filed on May 13, 2016, which provisional application is incorporated by this reference.

TECHNICAL FIELD

Embodiments herein relate to a transmitter and a wireless communication device comprising a transmitter and methods performed therein.

BACKGROUND

Internet of Things

The Internet of Things (IoT) society has expectations of billions of connected sensor and actuation devices. Such devices are expected to be operational several of years on a coin-cell battery, while still being produced at extreme low implementation cost. To achieve these goals, peak communication rates are optimized for different use cases; power efficient physical layer methods as e.g. modulation techniques are utilized, as well as reusable implementation designs.

In Industrial Scientific Medical (ISM) non-licensed shared spectrum bands, many technologies share and co-exist with devices enforced to follow etiquette rules. Examples of such etiquette rules imposed by regulators are: Listen-Before-Talk (LBT) mechanisms, limits on medium utilization, and limits on transmit power. Besides various WiFi technologies, two popular technologies for IoT Machine to Machine (M2M) communication in the 2.4 GHz ISM-band are Bluetooth and Zigbee. One recent variant of the Bluetooth technology is called Bluetooth Low Energy (BLE), and its standardized physical layer (PHY) is based on Gaussian Minimum Shift Keying (GMSK) modulation. Zigbee on the other hand uses the physical layer of the Institute of Electrical and Electronics Engineers (IEEE) 802.15.4 standard and is based on Direct Sequence Spread Spectrum (DSSS) and utilizes Offset Quadrature Phase Shift Keying (O-QPSK) modulation. Ecosystems with existing chipsets HardWare (HW) supporting Bluetooth and Zigbee are huge, with e.g. Bluetooth available in 2.2 billion mobile devices.

GMSK

GMSK is a modulation method for providing phase shift keying. It is employed in many wireless and satellite communications technologies, including Global System for Mobile Communications (GSM) and Bluetooth Low Energy (BLE). A block diagram of a GMSK modulator is shown in FIG. 1. It comprises a differential encoder 110, a Gaussian low pass filter 120 and an FM modulator 130.

GMSK provides constant envelope and compact spectrum. GMSK is flexible and may be tuned to give a compromise among spectral compactness, equalization and/or demodulation complexity, and link performance. A designer of the physical layer for a wireless communication system may choose a bit period, also called symbol duration, T, a bandwidth-time product BT and a differential encoder. The bandwidth-time product determines the bandwidth of the Gaussian low pass filter 120. A small BT product will increase the spectral compactness but will also increase Inter-Symbol Interference (ISI), which in turn will require a more advanced receiver or will result in performance losses, when compared to a GMSK signal with the same bit period but larger BT. The differential encoder 110 has an impact on the trade-off between receiver performance and receiver complexity. Different differential encoder choices lead to different receiver designs, with varying degrees of complexity.

In FIG. 1, the input bits to the differential encoder 110 are denoted by $a_k$ and the output bits $b_k$. The differential encoder 110 may be designed in many different ways. A few examples are given below, where the sum is understood to be modulo 2. That is, the bits are considered to be elements in the Galois Field GF(2).

No differential encoding: $b_k=a_k$. For example BLE does not employ a differential encoder. This type of encoder is useful when it is desired to allow low complexity differential detection at the receiver.

$b_k=a_k+a_{k-1}$. This type of differential encoding is used in GSM.

$b_k=1-(a_k+b_{k-1})$. This type of differential encoding is useful when two bit differential detection is used at the receiver.

The list above is not exhaustive, and indeed there are more types of differential encoders available for a PHY designer (e.g. encoders designed to enable three bit differential decoding). The list illustrates that various differential encoders are chosen by designers of wireless systems.

O-QPSK

O-QPSK is a linear modulation technique that is known to be spectrally equivalent to Minimum Shift Keying (MSK). That is, MSK and O-QPSK modulated signals exhibit the same spectrum. A block diagram of an O-QPSK modulator is shown in FIG. 2. In this figure, the input chips $c_k \in \{-1, 1\}$ are transformed to the baseband time domain signal y(t). First, the chip stream is split into two streams, the first comprising the even chips and the second comprising the odd chips. An impulse train modulated by the chips are passed through a pulse shaping filter p(t) in order to obtain the baseband signal. In O-QPSK, $$p(t) = \begin{cases} \sin\frac{\pi t}{2T}, & \text{when } 0 \le t \le 2T \\ 0, & \text{otherwise} \end{cases}$$

Although both GMSK and O-QPSK are good modulation choices for IoT applications, devices using them are not able to understand each other. Meanwhile, since two of the most popular IoT technologies, Bluetooth and Zigbee, are based on GMSK and O-QPSK, respectively, such HW and implementations are already vastly present in the market.

Discussions are in progress within the IEEE 802.15.4 standardization to potentially also introduce a mode utilizing GMSK modulation beyond the already existing O-QPSK modulation technology. The amendment to the standard is developed in the IEEE 802.15.4t workgroup and defined for operation in the 2.4 GHz ISM-band.

In U.S. Pat. No. 7,869,409, a multi-mode transmitter which is adapted to modulate a data packet communicated by a wireless communications signal is disclosed. The data packet header is modulated with a spread spectrum technique, while the data may or may not be modulated using a spread spectrum technique. In addition, the transmitter includes an encoding circuit coupled to a so-called PN-code generator. This encoder circuit performs O-QPSK to MSK encoding, which comprises binary differential decoding followed by alternate bit inversion. Since the encoder circuit is coupled to the PN-code generator i.e. only used when spread spectrum modulation is used, the encoding circuit only applies binary differential decoding, and it is only applicable in an MSK transmitter.

SUMMARY

It is therefore an object of embodiments herein to provide an improved technique and transmitter to generate signals with multiple modulation waveforms.

According to a first aspect of embodiments herein, the object is achieved by a transmitter in a first wireless communication device. The transmitter comprises a GMSK modulator and a rate selector configured to select a data rate. The rate selector comprises an input configured to receive input bits and an output to provide the bits with the selected data rate. The transmitter further comprises a bit to symbol mapper configured to receive the bits from the rate selector and map the bits to symbols of an arbitrary alphabet; and a spreading unit configured to spread the symbols received from the bit to symbol mapper to a chip sequence by means of a spreading code. The transmitter further comprises a re-mapping unit configured to map the chip sequence received from the spreading unit to produce signals for providing to the GMSK modulator.

In some example embodiments the rate selector is configured to select the data rate depending on capabilities of a receiver in a second wireless communication device, and wherein the capabilities of the receiver in the second wireless communication device comprises a data rate and at least one of:
  a) support for spread spectrum modulation;
  b) support for differential decoding and a type of differential code;
  c) support for MSK modulation;
  d) support for GMSK modulation.

In some example embodiments the re-mapping unit is a chip re-mapper configured to map the chip sequence back to bits to produce signals for providing to the GMSK modulator.

In some example embodiments, when the receiver in the second wireless communication device is capable of receiving a signal modulated using a spread spectrum technique, the rate selector is configured to select one data rate compatible with the data rate supported by the receiver, and wherein the re-mapping unit comprises at least one of a differential encoder and a bit alternation unit and is configured to map the chip sequence to bits to produce signals to the GMSK modulator.

In some example embodiments, when the receiver in the second wireless communication device is capable of receiving a GMSK signal, and the rate selector is configured to select one data rate compatible with the data rate supported by the receiver, and provide the bits with the selected data rate directly to the GMSK modulator.

In some example embodiments, when the receiver in the second wireless communication device is capable of receiving a GMSK signal, and the rate selector is configured to select one data rate compatible with the data rate supported by the receiver, and wherein the transmitter further comprises a differential encoder configured to receive the bits from the rate selector and generate bits for providing to the GMSK modulator, wherein the differential encoder is configured to match a code used by a differential decoder in the receiver support for differential decoding.

According to a second aspect of embodiments herein, the object is achieved by a transmitter in a first wireless communication device. The transmitter comprises a modulator and a rate selector configured to select a data rate. The rate selector comprises an input configured to receive input bits and an output to provide the bits with the selected data rate. The transmitter further comprises a bit to symbol mapper configured to receive the bits from the rate selector and map the bits to symbols of an arbitrary alphabet; and a spreading unit configured to spread the symbols received from the bit to symbol mapper to a chip sequence by means of a spreading code for providing to the modulator. The transmitter further comprises a re-mapping unit configured to map the bits received from the rate selector to produce signals for providing to the modulator.

In some example embodiments the rate selector is configured to select the data rate depending on capabilities of a receiver in a second wireless communication device, and wherein the capabilities of the receiver in the second wireless communication device comprises a data rate and at least one of:
  a) support for spread spectrum modulation;
  b) support for differential decoding and a type of differential code;
  c) support for MSK modulation;
  d) support for GMSK modulation.

In some example embodiments the modulator is an O-QPSK modulator.

In some example embodiments the re-mapping unit is a bit re-mapper configured to differentially encode the bits and produce signals for providing to the O-QPSK modulator.

In some example embodiments, when the receiver in the second wireless communication device is capable of receiving a GMSK signal, and the rate selector is configured to select one data rate compatible with the data rate supported by the receiver, the re-mapping unit is configured to apply a differential code and bit alternation depending on the capabilities of the receiver and the bits are re-mapped to antipodal binary symbols to provide signals to an O-QPSK modulator.

In some example embodiments, the transmitter further comprises a filter applied to an output of the O-QPSK modulator in order to match spectral characteristics of a modulated signal from the transmitter to spectral characteristics of the GMSK signals supported by the receiver in the second wireless communication device.

In some example embodiments, when the receiver in the second wireless communication device is capable of receiving a signal modulated using a spread spectrum technique, the rate selector is configured to select one data rate compatible with the data rate supported by the receiver, and wherein the spreading unit is configured to provide signals to the O-QPSK modulator.

In some example embodiments, when the receiver in the second wireless communication device is capable of receiving both GMSK signals and signals modulated using a spread spectrum technique, the data rate selector is configured to select any data rate compatible with the data rates supported by the receiver in the second wireless communication device by means of either a rate adaptation algorithm or a pre-determined fixed choice.

According to some example embodiments, the transmitter may be implemented digitally by means of firmware upgrades. For example, for a BLE, Bluetooth, or Bluetooth long range chipset, or IEEE 802.15.4 chipset, the above technique to generate signals with multiple modulation waveforms may be implemented digitally by means of firmware upgrades in the chipset.

According to some example embodiments, a wireless communication device comprises a transmitter according the above.

The wireless chipset industry has spent much effort and resources developing energy efficient HW for various radio technologies such as BLE or Zigbee. This hardware has different capabilities and supports different Physical layers (PHY's). These various PHY's may employ different constant envelope modulations such as O-QPSK, MSK or GMSK. The different modulations may have been tuned according to different parameter choices, such as: the data rate e.g. adding a spreading code previous to O-QPSK modulation in IEEE 802.15.4; the BT product for GMSK; and a specific choice for a differential encoder for GMSK.

The method and transmitter according to embodiments herein, provide a technique to make different PHY's compatible with each other, provided the various PHY's have the same air symbol rate. According to the method and transmitter herein, a pre-defined modulator designed for a given modulation technique may be modified so that it generates signals that may be successfully received and decoded by a de-modulator designed for a different technology in a receiver. This is accomplished by a judicious design of re-mappers and filters so that modulations that satisfy the properties inherent of one modulation technique may be generated using hardware designed for a different modulation technique.

Therefore the method and transmitter according to embodiments herein provide a technique to reuse existing implementations to also generate other modulation waveforms than originally optimized and designed for. Further, since this multiple modulation waveform generation technique may be implemented digitally, only firmware updates is required, so it is operable on existing already deployed HW, which leads less cost and more flexibility.

BRIEF DESCRIPTION OF THE DRAWINGS

Embodiments will now be described in more detail in relation to the enclosed drawings, in which.

DETAILED DESCRIPTION

Embodiments herein relates to one or more transmitters in wireless communication devices, and provide ways of making different PHY's compatible with each other, provided the various PHY's have the same air symbol rate. It is disclosed how to modify a pre-defined modulator designed for a given modulation technique so that it generates signals that can be successfully received and decoded by a de-modulator designed for a different technology. This is accomplished by a judicious design of re-mappers and filters so that modulations that satisfy the properties inherent of one modulation technique can be generated using hardware designed for a different modulation technique.

Transmitter Examples

Some exemplary embodiments are first described. The transmitter according to embodiments herein may e.g. be based on O-QPSK modulation or GMSK modulation, and may e.g. operate in two modes, 250 kbit/s mode and 2 Mbit/s mode.

GMSK Based Modulation

Embodiments herein may be used to enhance a BLE modulator in order to generate signals that can be successfully decoded by legacy IEEE 802.15.4 receivers.

The 250 kbit/s mode is based on the O-QPSK modulation used in for example IEEE 802.15.4. Such O-QPSK compliant signals may be generated with a GMSK modulator by carefully applying the appropriate precoding. This may be done with existing BLE GMSK based HW by introducing the IEEE 802.15.4 bit to symbol and symbol to chip mappers, plus a new chip re-mapper in the transmission (TX) chain.

The 2 Mbit/s mode is based on GMSK modulation. This may readily be done with existing BLE HW without any significant modifications to the PHY.

O-QPSK Based Modulation

Embodiments herein may be used to enhance an IEEE 802.15.4 modulator in order to generate signals that may be successfully decoded by BLE receivers.

Since the 250 kbit/s mode is based directly on O-QPSK modulation, the signals may be generated directly from existing IEEE 802.15.4 HW.

Since the 2 Mbit/s mode is based on GMSK modulation, generating such signals with O-QPSK modulator requires a new re-mapping functionality. Using the new re-mapper, the 2 Mbit/s mode may also be realized with for example IEEE 802.15.4 HW.

It was noted above that the new PHY, i.e. the transmitter according to embodiments herein, may be realized using either O-QPSK modulation, or GMSK modulation. To generate the 2 Mbit/s signal using the O-QPSK modulator, a bit re-mapper is required in the transmission chain. To generate the 250 kbit/s signal using the GMSK modulator, a chip re-mapper is required in the transmission chain. These re-mappers, referred as re-mapping unit, will now be described in detail.

O-QPSK Bit Re-Mapping for 2 Mbit/s

By performing accurate re-mapping of a bit sequence of data fed to the O-QPSK modulator, MSK modulation may be obtained. In order to produce clean GMSK signals, additional filtering will be performed according to embodiments herein.

Figure 1:
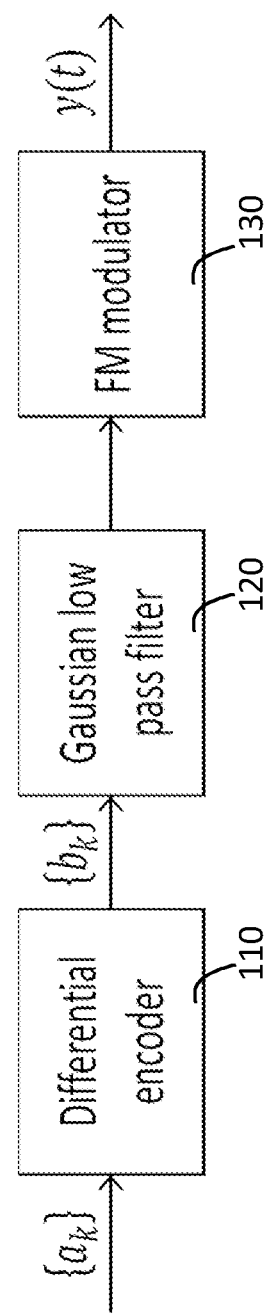
FIG. 1 is a schematic block diagram depicting a GMSK modulator.
Figure 2:
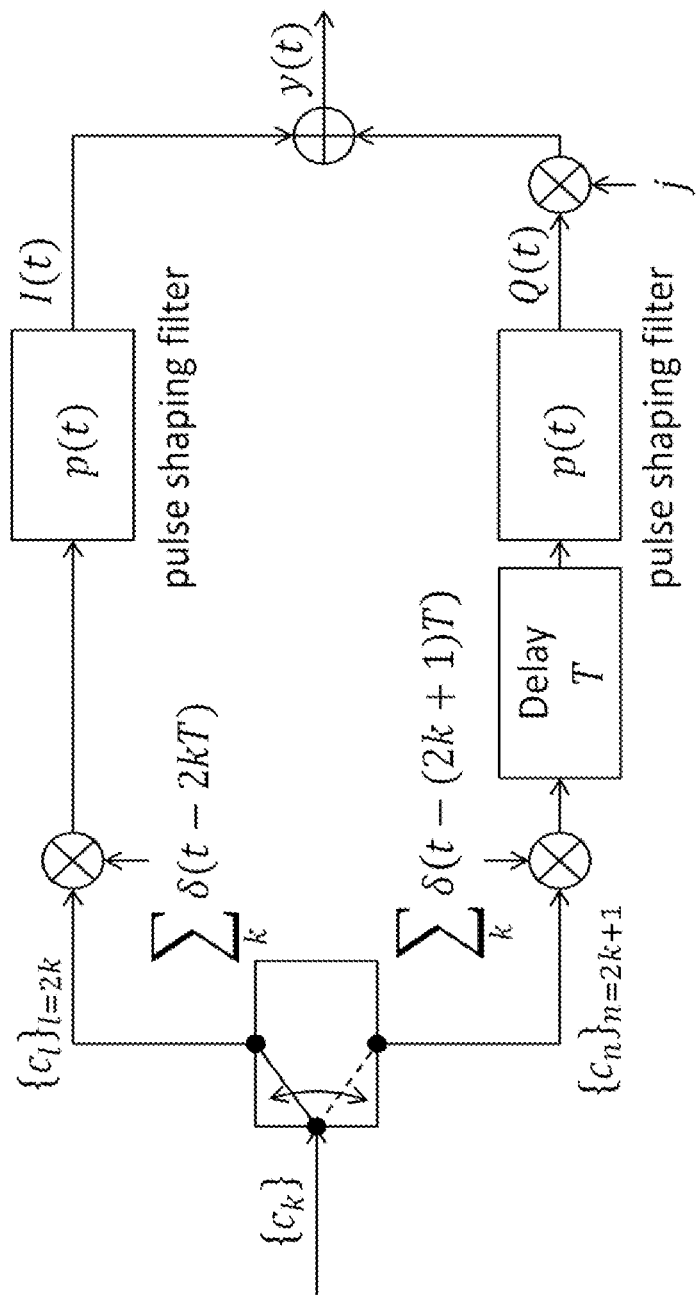
FIG. 2 is a schematic block diagram of an O-QPSK modulator.
Figure 3:
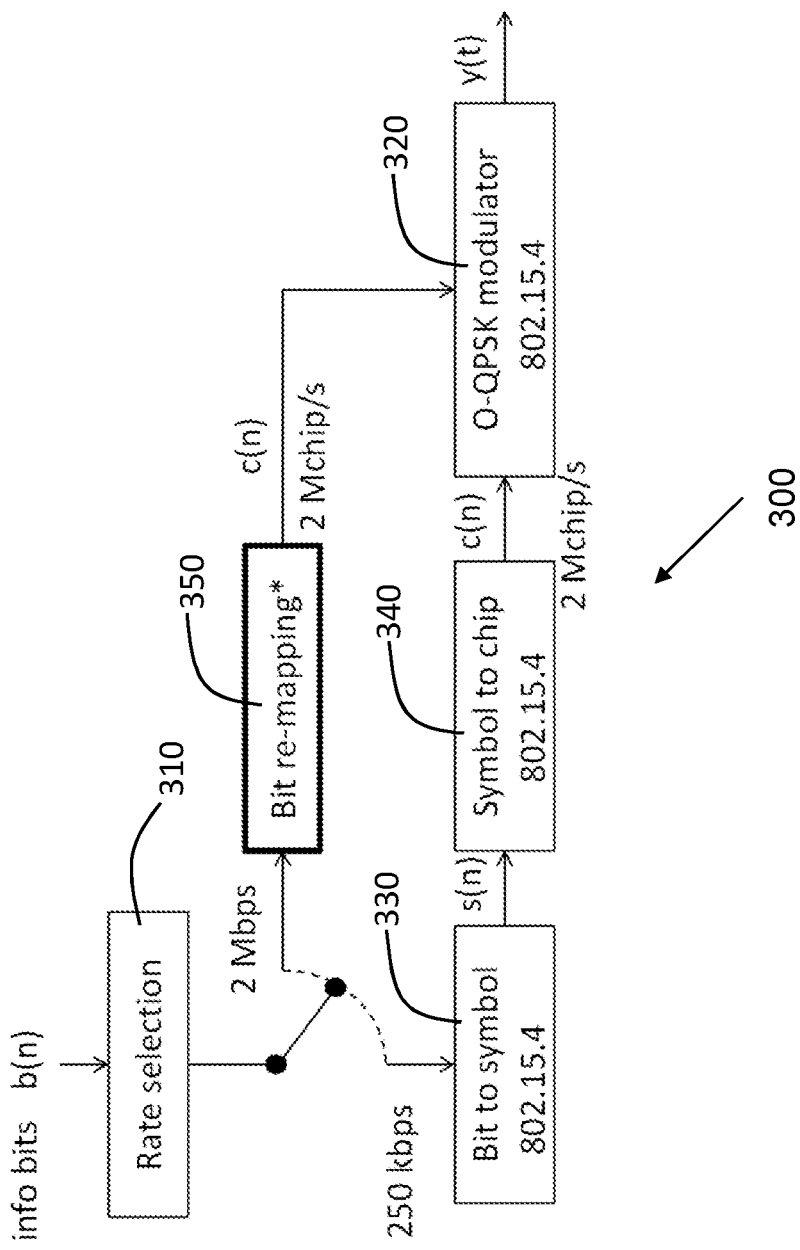
FIG. 3 is a schematic block diagram depicting embodiments of PHY using O-QPSK based modulator.

FIG. 3 illustrates how to enhance an IEEE 802.15.4 transmitter, i.e. an IEEE 802.15.4 TX chain, in order to generate signals that may be received by a BLE receiver. FIG. 3 illustrates the PHY, such as a transmitter 300 according to embodiments herein, using e.g. an O-QPSK based modulator, for example with Zigbee HW. A 250 kbit/s switch will generate legacy IEEE 802.15.4 signals, while the 2 Mbps switch will generate 2 Mbit/s MSK modulated signals.

As shown in FIG. 3, the transmitter 300 comprises a rate selector 310 configured to select a data rate. The rate selector 310 comprises an input configured to receive input bits b(n), denoted as info bits b(n) in FIG. 3, and an output to provide the bits with the selected data rate. The transmitter 300 further comprises a modulator 320. The modulator 320 may be a linear modulator, e.g. an O-QPSK modulator, but may also be another kind of modulator.

As discussed above, the transmitter 300 operates in two modes, 250 kbit/s mode and 2 Mbit/s modes, therefore it has two branches.

In the first branch, i.e. when operating in 250 kbit/s mode, the transmitter 300 comprises a bit to symbol mapper 330 configured to receive the bits from the rate selector 310 and map the bits to symbols of an arbitrary alphabet. The transmitter 300 further comprises a spreading unit 340, i.e. a symbol to chip mapper 340, configured to spread the symbols received from the bit to symbol mapper 330 to a chip sequence by means of a spreading code for providing to the modulator 320.

In the second branch, i.e. when operating in 2 Mbit/s mode, the transmitter 300 comprises a re-mapping unit 350 configured to map the bits received from the rate selector 310 to produce signals for providing to the modulator 320.

In this way, depending on different data rate, the modulator 320 receives signals from either the re-mapping unit 350 or the spreading unit 340 and may generate legacy IEEE 802.15.4 signals and 2 Mbit/s MSK modulated signals.

Derivation of the Re-Mapper, i.e. the Re-Mapping Unit 350:

It is now presented a derivation of the re-mapper for the O-QPSK modulator 320 to generate MSK signals. The derivation relies on the linearization of continuous phase modulated signals introduced by Laurent in Exact and Approximate Construction of Digital Phase Modulations by Superposition of Amplitude Modulated Pulses (AMP), P. Laurent IEEE Transactions on Communications, Year: 1986, Volume: 34, Issue: 2. This reference is referred to as Laurent herein.

The following notation is introduced:

b(n): input bits. Since embodiments herein are not concerned with channel coding, the input bits may refer to information bits, guard bits, padding bits, training bits, code bits produced by e.g. a convolutional code or a low density parity check, or some other code or other type of bits. Herein, the input bits are meant the bits that are fed to the modulator, and may include guard bits, padding bits, cyclic redundancy check bits, payload data bits and other.

Embodiments herein will be exemplified utilizing numerology from IEEE 802.15.4 and BLE.

$C_o$: Laurent's main pulse for GMSK with BT=0.5 (BT corresponding to BLE)

T=0.5 μs. This is the air bit period for both IEEE 802.15.4 and BLE.

The method of Laurent suggests that one may write a BLE signal in the following way.

$$d(n) = 1 - 2b(n)$$

$$x_{BLE}(t) = \exp(j\varphi(t)) \cong \sum_n j^{\sum_{k \leq n} d(n)} C_o(t - nT)$$

Define $$e(n) = \sum_{k=0}^{n} d(k)$$

Since $j^{d(n)} = j \cdot d(n)$ then $$x_{BLE}(t) \cong \sum_n j^n \prod_{k=0}^{n} d(k) C_o(t - nT)$$

$$= \sum_n j^n e(n) C_o(t - nT)$$

$$= \sum_n j^{2n} e(2n) C_o(t - 2nT) + j \sum_n j^{2n} e(2n+1) C_o(t - (2n+1)T)$$

$$j^{2n} = (-1)^n$$

$$c(2n) \equiv (-1)^n e(2n)$$

$$c(2n+1) \equiv (-1)^n e(2n+1)$$

$$x_{BLE}(t) \cong \sum_n c(2n) C_o(t - 2nT) + j \sum_n c(2n+1) C_o(t - (2n+1)T)$$

Replace the pulse $C_o(t)$ by the half sine pulse p(t) to obtain $$x_{BLE}(t) \cong \sum_n c(2n) p(t - 2nT) + j \sum_n c(2n+1) p(t - (2n+1)T)$$

The right hand side is exactly an O-QPSK signal $$x_{O-QPSK}(t) = \sum_n c(2n) p(t - 2nT) + j \sum_n c(2n+1) p(t - (2n+1)T)$$

The signal $x_{O-QPSK}(t)$ is obtained by feeding the "chip" sequence c(n) to the 802.15.4 O-QPSK modulator 320.

Hence, an approximation of the BLE signal may be obtained by re-mapping the input bits b(n) to chips in the bit to symbol mapper 330 and the symbol to chip mapper 340 in the IEEE 802.15.4 TX chain:

b(n)→c(n)

The bit re-mapper is defined by the steps given above:

b(n)→d(n)→e(n)→c(n)

GMSK Chip Re-Mapping for 250 Kbit/s

Figure 4:
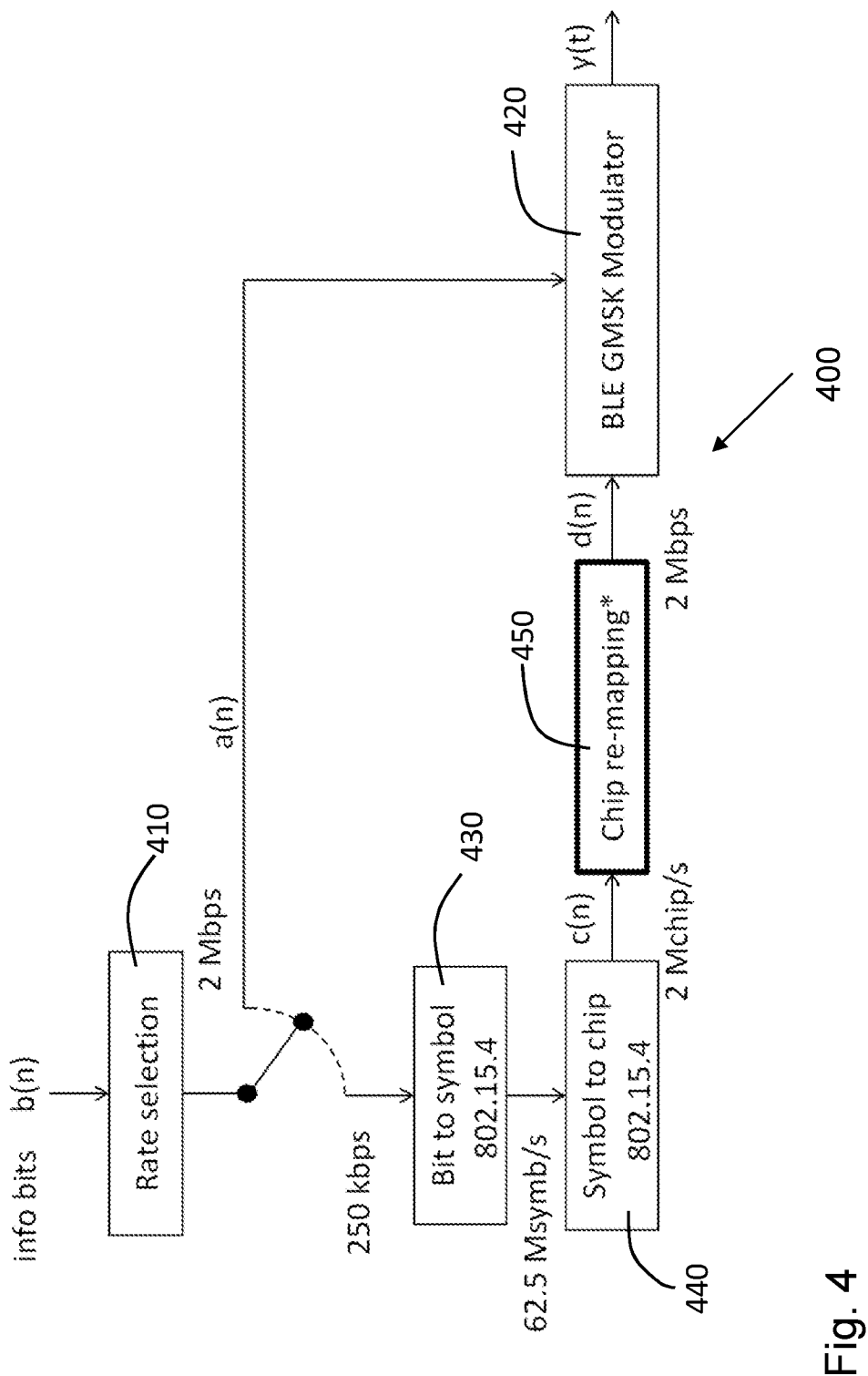
FIG. 4 is a schematic block diagram depicting embodiments of PHY using GMSK based modulator.

FIG. 4 illustrates how to enhance a BLE transmitter in order to generate signals that may be received by an IEEE 802.15.4 receiver according to some embodiments. FIG. 4 illustrates a PHY, such as a transmitter 400 according to embodiments herein, using GMSK based modulator, for example a PHY with BLE HW. As discussed above for the transmitter 300, the transmitter 400 operates in two modes, 250 kbit/s mode and 2 Mbit/s modes, therefore it has two branches. The 250 kbit/s switch will generate legacy IEEE 802.15.4 signals, while the 2 Mbps switch will generate 2 Mbit/s GMSK modulated signals.

As shown in FIG. 4, the transmitter 400 comprises a rate selector 410 configured to select a data rate. The rate selector 410 comprises an input configured to receive input bits b(n), denoted as info bits b(n) in FIG. 4, and an output to provide the bits with the selected data rate.

The transmitter 400 comprises a GMSK modulator 420, so it is a GMSK modulation based transmitter.

In the first branch, i.e. 250 kbit/s mode, the transmitter 400 comprises a bit to symbol mapper 430 configured to receive the bits from the rate selector 410 and map the bits to symbols of an arbitrary alphabet.

Further, the transmitter 400 comprises a spreading unit 440, i.e. symbol to chip mapper 440, configured to spread the symbols received from the bit to symbol mapper 430 to a chip sequence by means of a spreading code.

In addition, the transmitter 400 comprises a re-mapping unit 450 configured to map the chip sequence received from the spreading unit 440 to produce signals for providing to the GMSK modulator 420.

In the second branch, i.e. 2 Mbits/s mode, the rate selector 410 selects a data rate compatible with the data rate supported by a receiver, and bypasses both the bit to symbol mapper 430 and spreading unit 440 and the chip re-mapping unit 450, and provides the bits with selected data rate directly to the GMSK modulator 420.

The following notation is used when describing the re-mapping unit 450:

c(n): chips after IEEE 802.15.4 spreading in the spreading unit 440
$C_o$: Laurent's main pulse for GMSK with BT=0.5
T=0.5 μs. This is an air bit period for both BLE and IEEE 802.15.4.
The chips are re-mapped in chip re-mapping unit 450:

$$c(n) \to d(n)$$

as follows $$e(2n) \equiv (-1)^{-n} c(2n) = (-1)^n c(2n)$$

$$e(2n+1) \equiv (-1)^{-n} c(2n+1) = (-1)^n c(2n+1)$$

$$d(0) \equiv e(0)$$

$$d(n) \equiv e(n) \cdot e(n-1)$$

The binary symbols d(n), or alternatively, the bits (1−d(n))/2, are fed to the GMSK modulator 420 with BT=0.5.
To see why this works, approximate $$x_{BLE}(t) \cong \sum_n j^{\sum_{k \le n} d(n)} C_o(t - nT) = \sum_n j^n \prod_{k=0}^{n} d(k) C_o(t - nT)$$

Note that $e(k)^2 = 1$ implies $$\prod_{k=0}^{n} d(k) = \prod_{k=0}^{n} e(k) \prod_{k=0}^{n-1} e(k) = e(n)$$

Hence $$x_{BLE}(t) \cong \sum_n j^n e(n) C_o(t - nT) x_{BLE}(t) \cong$$

$$\sum_n j^{2n} e(2n) C_o(t - 2nT) + j \sum_n j^{2n} e(2n+1) C_o(t - (2n+1)T)$$

$$x_{BLE}(t) = \sum_n (-1)^n e(2n) C_o(t - 2nT) +$$

$$j \sum_n (-1)^n e(2n+1) C_o(t - (2n+1)T)$$

-continued
$$x_{BLE}(t) = \sum_n c(2n) C_o(t - 2nT) + j \sum_n c(2n+1) C_o(t - (2n+1)T)$$

Which is an approximation to $$x_{O\text{-}QPSK}(t) = \sum_n c(2n) p(t - 2nT) + j \sum_n c(2n+1) p(t - (2n+1)T)$$

However, the signal $x_{O\text{-}QPSK}(t)$ does not have the same spectral characteristics as a BLE signal. By further filtering the signal $x_{O\text{-}QPSK}(t)$, a new signal $x_{BLE}(t)$ having almost the same spectrum as a BLE signal is generated as follows.

$$x_{O\text{-}QPSK}(t) \to \boxed{\frac{C_0(f)}{P(f)}} \to x_{BLE}(t)$$

Figure 5:
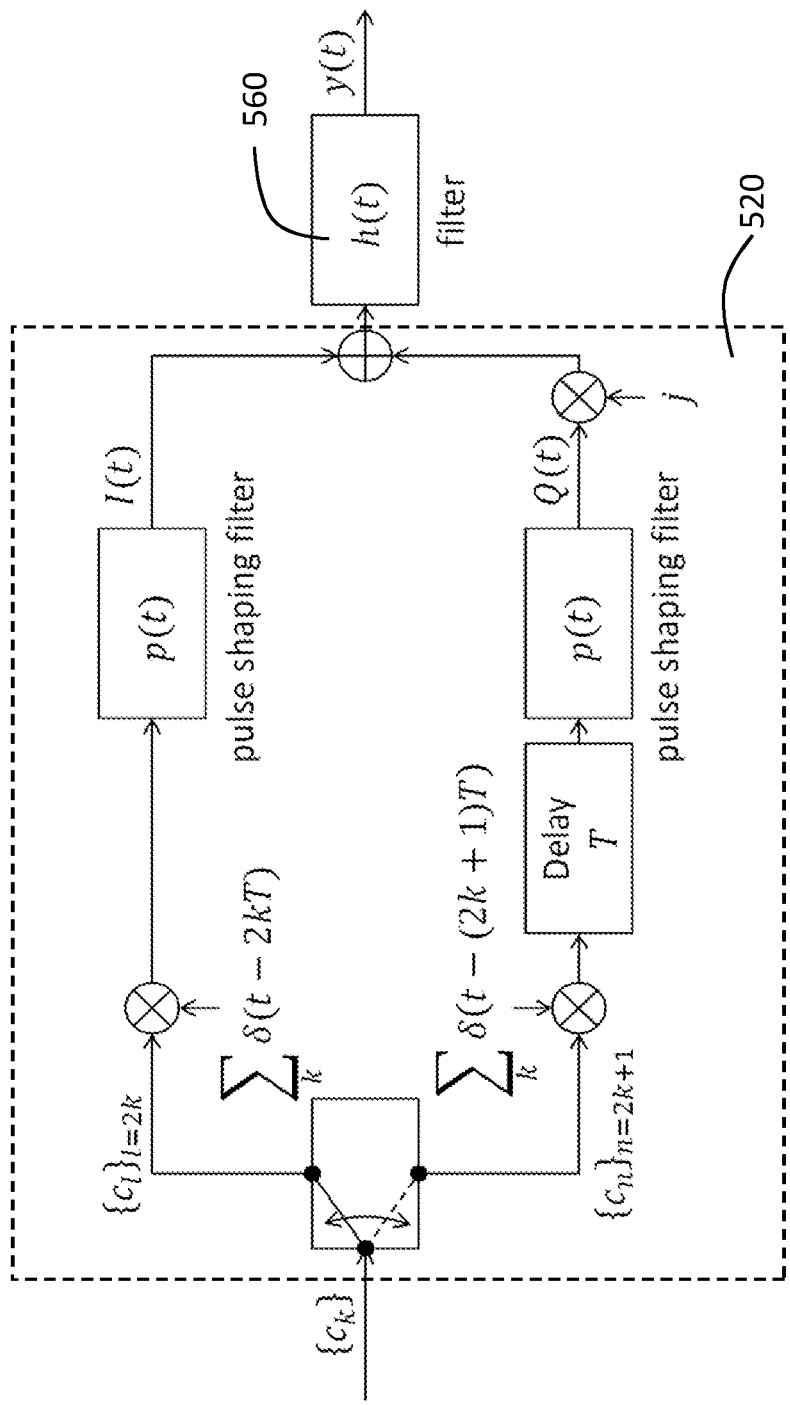
FIG. 5 is a schematic block diagram depicting embodiments of an O-QPSK modulator.

Here $C_0(f)$ is the frequency response of the Laurent pulse $C_0$ and $P(f)$ is the frequency response of the half-sine pulse shaping filter used in O-QPSK, and the division may be implemented numerically by means of de-convolution. The use of the filter with frequency response $$h(f) = \frac{c_0(f)}{P(f)}$$

is illustrated in FIG. 5.

FIG. 5 illustrates an O-QPSK modulator 520 such as e.g. the O-QPSK modulator 320, together with an additional filter h(t) 560. This filter 560 may be used to shape the spectrum of the output from the O-QPSK modulator 520 so that it complies to spectrum regulations.

The wireless chipset industry has spent much effort and resources developing energy efficient HW for various radio technologies such as Bluetooth low energy or Zigbee. This hardware has different capabilities and supports different PHY's. These various PHY's may employ different constant envelope modulations such as O-QPSK, MSK or GMSK. The different modulations may have been tuned according to different parameter choices, such as e.g.

the data rate, e.g. adding a spreading code previous to O-QPSK modulation in IEEE 802.15.4,
the BT product for GMSK,
a specific choice for a differential encoder for GMSK.

In embodiments herein it is described how to make different PHY's compatible with each other, provided the various PHY's have the same air symbol rate. It is described how to modify a pre-defined modulator designed for a given modulation technique so that it generates signals that may be successfully received and decoded by a de-modulator designed for a different technology. This is accomplished by a judicious design of re-mappers and filters as described above so that modulations that satisfy the properties inherent of one modulation technique may be generated using hardware designed for a different modulation technique.

Figure 6:
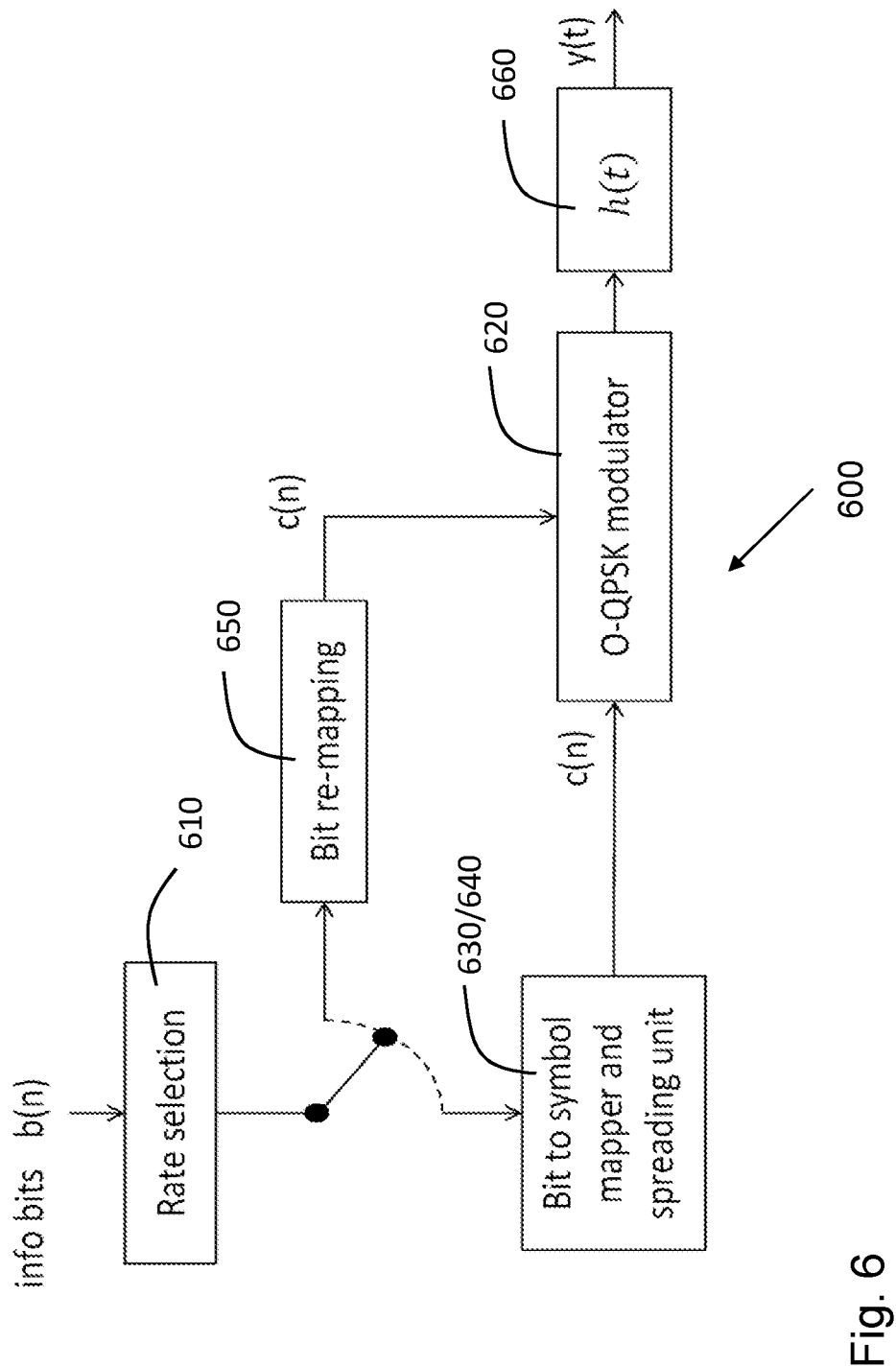
FIG. 6 is a schematic block diagram depicting embodiments of how to enhance an O-QPSK modulator.

More generally, FIG. 6 illustrates a generic TX architecture that supports a spread spectrum PHY and a GMSK PHY and that is well suited for implementation in chipsets supporting the spread spectrum PHY. FIG. 6 illustrates how to enhance an O-QPSK modulator so that it may generate signals that may be successfully received by receivers supporting either spread spectrum modulation or GMSK modulation.

According to some embodiments herein a transmitter is provided, e.g. related to FIG. 6.

A transmitter 600 in a first wireless communication device, comprising a rate selector 610 configured to choose the data rate, a bit to symbol mapper and spreading unit 630/640 configured to map the bits b(n) to symbols of an arbitrary alphabet and then spread the symbols to a chip sequence c(n) by means of a spreading code, and a bit re-mapper 650, i.e. bit re-mapping unit 650, configured to differentially encode the bits, and where said bit re-mapper 650 is connected to an O-QPSK modulator 620. The O-QPSK modulator 620 is optionally followed by a filter 660.

According to some embodiments, the rate selector 610 selects the data rate depending on the capabilities of a receiver in a second wireless communication device. The capabilities of the receiver in a second wireless communication device include at least one data rate and at least one of:
a) support for spread spectrum modulation;
b) support for differential decoding, and the type of differential code;
c) support for MSK modulation;
d) support for GMSK modulation.

When the receiver in the second wireless communication device is capable of receiving a signal modulated using a spread spectrum technique, the rate selector selects one data rate compatible with the data rate supported by the receiver. The input bits b(n) are mapped to symbols and spread using a spreading code, by means of the bit to chip mapper and spreading unit 630/640, resulting in a sequence of chips c(n). The bit to symbol mapping and spreading unit 630/640 is connected to the O-QPSK modulator 620 for providing the sequence of chips c(n) to the O-QPSK modulator 620.

When the receiver in the second wireless communication device is capable of receiving a GMSK signal, here an MSK signal is considered as an instance of GMSK with infinite bandwidth-time product, the rate selector 610 selects a data rate compatible with the data rate supported by the receiver. The bit re-mapping unit 650 is configured to apply a differential code and bit alternation depending on the capabilities of the receiver. The input bits b(n) are re-mapped to antipodal binary symbols by means of the bit re-mapping unit 650. The bit re-mapping unit 650 is connected to the O-QPSK modulator 620 for providing signals to the O-QPSK modulator 620.

Optionally, a filter 660 is applied to the output of the O-QPSK modulator 620 in order to match the spectral characteristics of the transmitted signal to the spectral characteristics of the GMSK signals supported by the second wireless communication device.

When the receiver in the second wireless communication device is capable of receiving both GMSK signals and signals modulated using a spread spectrum technique, the data rate selector 610 selects any data rate compatible with the data rates supported by the second wireless communication device by means of either a rate adaptation algorithm or a pre-determined fixed choice.

Figure 7:
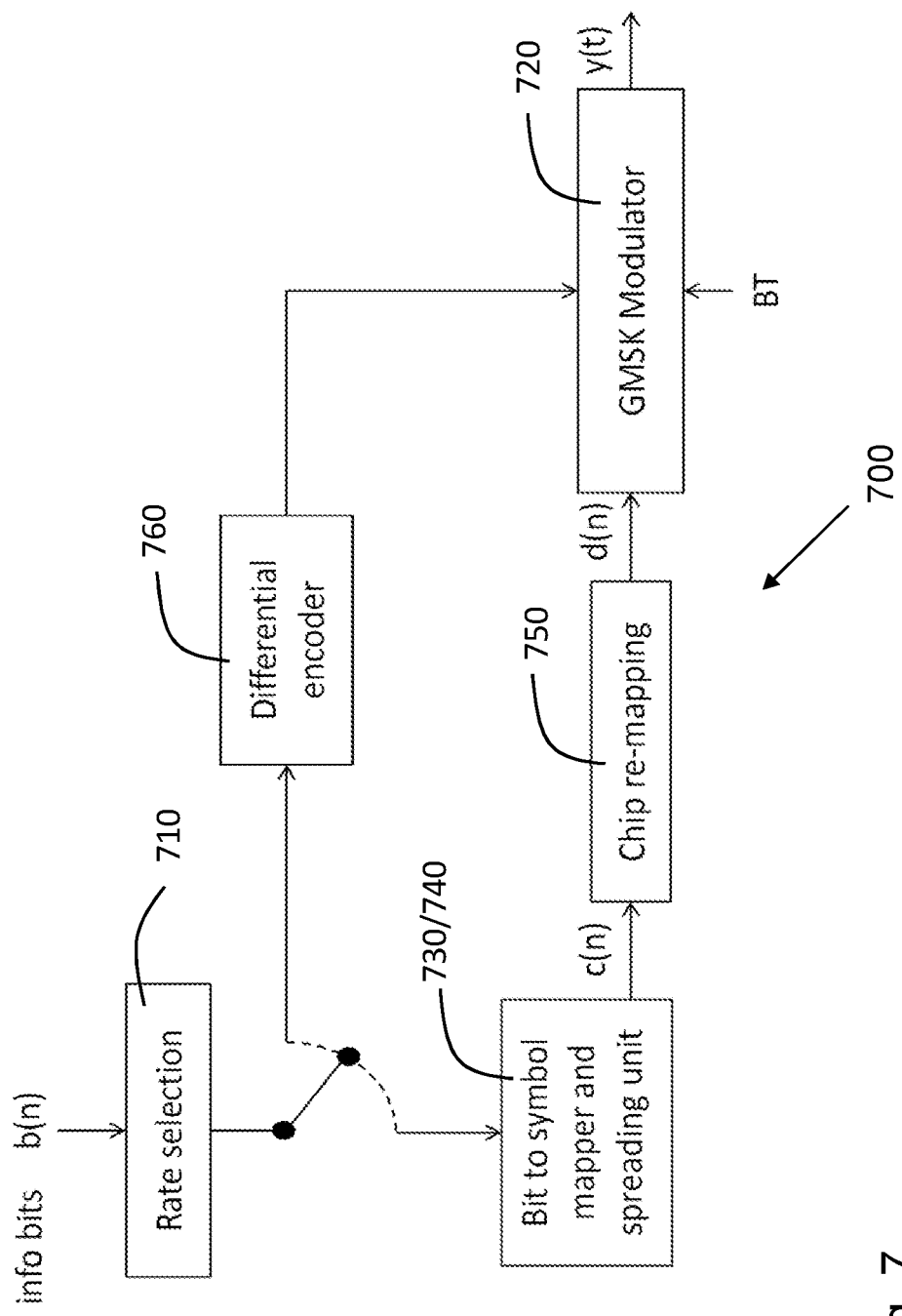
FIG. 7 is a schematic block diagram depicting embodiments of how to enhance a GMSK modulator.

More generally, FIG. 7 illustrates a generic TX architecture that supports a spread spectrum PHY and a GMSK PHY and that it is well suited for implementation in chipsets supporting the GMSK PHY. FIG. 7 illustrates how to enhance a GMSK modulator so that it may generate signals that may be successfully received by receivers supporting either spread spectrum modulation or GMSK modulation.

According to some further embodiments herein a transmitter is provided, e.g. according to FIG. 7.

A transmitter 700 in a first wireless communication device comprises a rate selector 710 configured to choose the data rate, a bit to symbol mapper and spreading unit 730/740 configured to map the bits b(n) to symbols of an arbitrary alphabet and then spread the symbols to a chip sequence c(n) by means of a spreading code. The transmitter 700 further comprises a chip re-mapper 750 configured to map the chips c(n) back to bits d(n), and where said chip re-mapper 750 is connected to a GMSK modulator 720, supporting a given BT product, including BT=∞, in which case GMSK becomes MSK, wherein e.g. the rate selector 710 is configured to select the data rate depending on capabilities of a receiver in a second wireless communication device.

The rate selector 710 selects the data rate depending on the capabilities of the receiver in the second wireless communication device, where the capabilities of the receiver in the second wireless communication device comprises at least one data rate and at least one of:
a) support for spread spectrum modulation;
b) support for differential decoding, and the type of differential code;
c) support for MSK modulation;
d) support for GMSK modulation.

When the receiver in the second wireless device is capable of receiving a signal modulated using a spread spectrum technique, the rate selector 710 selects one data rate compatible with the data rate supported by the receiver. The input bits b(n) are mapped to symbols and spread using a spreading code, by means of the bit to chip mapper and spreading unit 730/740, resulting in a sequence of chips c(n). The chips c(n) are mapped to bits by means of the chip re-mapping unit 750, wherein said re-mapping unit 750 comprises at least one of a differential encoder and a bit alternation unit, and the re-mapping unit 750 is configured to map the chip sequence to bits to produce the signals to the GMSK modulator 720.

When the receiver in the second wireless communication device is capable of receiving a GMSK signal, here an MSK signal is considered as an instance of GMSK with infinite bandwidth-time product, the rate selector 710 selects a data rate compatible with the data rate supported by the receiver, and bypasses both the bit to symbol mapper and spreading unit 730/740 and the chip re-mapping unit 750.

According to some embodiments, the rate selector 710 may provide the bits with selected data rate directly to the GMSK modulator 720 as in FIG. 4.

According to some embodiments, if the differential decoding capabilities are known at the receiver, the transmitter 700 may further comprise a differential encoder 760 configured to receive the bits from the rate selector 710 and generate bits to the GMSK modulator 720. The differential encoder 760 may be configured to match a code used by the receiver supporting differential decoding. That is the differential encoder 760 is chosen to match the code used by the differential decoder capabilities at the receiver.

When the receiver in the second wireless communication device is capable of receiving both GMSK signals and signals modulated using a spread spectrum technique, the data rate selector 710 may select any data rate compatible with the data rates supported by the second wireless communication device by means of either a rate adaptation algorithm or a pre-determined fixed choice.

Therefore embodiments herein relate to multiple modulation waveform re-mapping and generation, such as e.g. GMSK, O-QPSK modulation waveform generation, and also relate to multi-mode HW, waveform re-mapping in BLE, Zigbee, IEEE 802.15.4 PHY etc.

When the various PHY's operate in the same frequency band, embodiments herein may e.g. be implemented digitally by means of firmware upgrades.

That is a simple firmware updates to existing physical layer design will enable inter-operability between different HW, e.g. transmitter TX and receiver RX, configurations, for example:

Legacy IEEE 802.15.4 TX→BLE RX;
Legacy IEEE 802.15.4 TX→legacy IEEE 802.15.4 RX;
BLE TX→legacy IEEE 802.15.4 RX;
BLE TX→BLE RX.

Figure 8:
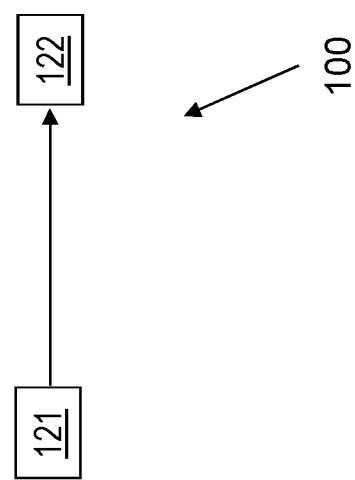
FIG. 8 is a schematic block diagram depicting embodiments of a wireless communications network.

Embodiments herein relate to wireless communication networks in general. FIG. 8 is a schematic overview depicting a wireless communication network 100. The wireless communication network 100 may use a number of different technologies, such as e.g. relating to ISM as described in the following:

In the ISM (Industrial, Scientific Medical) non-licensed shared spectrum bands, many technologies share and co-exist with devices enforced to follow etiquette rules. Examples of such etiquette rules imposed by regulators are: listen-before-talk (LBT) mechanisms, limits on the medium utilization, and limits on transmit power. Besides various WiFi technologies, two popular technologies for IoT Machine to Machine (M2M) communication in the 2.4 GHz ISM-band are Bluetooth and Zigbee. One recent variant of the Bluetooth technology is called Bluetooth Low Energy (BLE), and its standardized physical layer (PHY) is based on GMSK modulation. Zigbee on the other hand uses the physical layer of the IEEE 802.15.4 standard and is based on direct sequence spread spectrum (DSSS) and utilizes O-QPSK modulation. The ecosystems with existing chipsets hardware (HW) supporting Bluetooth and Zigbee are huge, with e.g. Bluetooth available in 2.2 billion mobile devices.

In the wireless communication network 100, wireless communication devices e.g. a first wireless communication device 121 comprising a respective transmitter such as e.g. the transmitter 300, 400, 600, 700, and a second communication wireless device 122 comprising a respective receiver. The first wireless communication device 121 and the second wireless communication device 122 communicates with each other. The first and second wireless communication devices may e.g. be a mobile station, a non-access point (non-AP) STA, a STA, a user equipment and/or a wireless terminals, It should be understood by the skilled in the art that "wireless communication device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets etc. and any wireless communication device mentioned herein.

Figure 9:
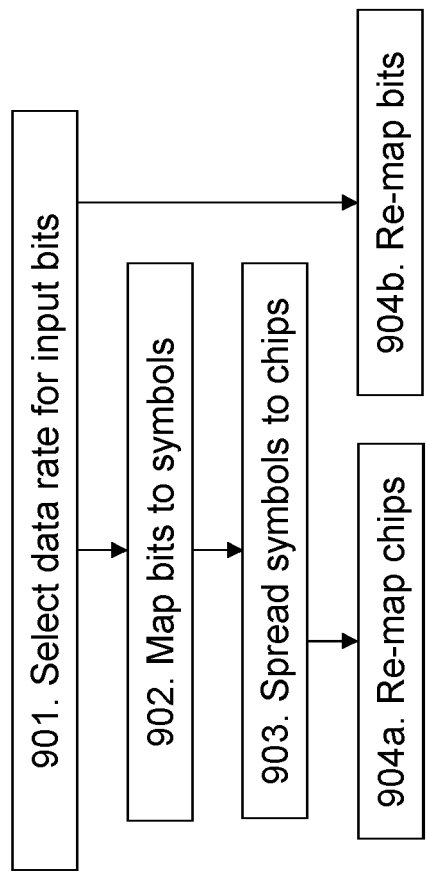
FIG. 9 is a flowchart depicting a method performed by a transmitter/wireless communication device according to embodiments herein.

FIG. 9 is a flowchart depicting a method performed by the first wireless communication device 121. The method in a transmitter 300, 400, 600, 700 in the first wireless communication device 121 comprises following actions:

Action 901

In order to generate waveforms for receivers with different modulations and data rates, the first wireless communication device 121 selects a data rate for input bits in a rate selector 310, 410, 610, 710. The rate selector 310, 410, 610, 710 comprises an input configured to receive input bits and an output to provide the bits with the selected data rate.

Action 902

The first wireless communication device 121 maps the bits to symbols of an arbitrary alphabet in a bit to symbol mapper 330, 430, 630, 730 configured to receive the bits from the rate selector.

Action 903

The first wireless communication device 121 spreads the symbols received from the bit to symbol mapper to a chip sequence by means of a spreading code in a spreading unit 340, 440, 640, 740.

Then for different modulators in the transmitter 300, 400, 600, 700, the method comprises following different actions:

Action 904a

If the transmitter 400, 700 comprises a GMSK modulator 420, 720, the first wireless communication device 121 re-maps in a re-mapping unit 450, 750 the chip sequence received from the spreading unit 440, 740 to produce signals for providing to the modulator 420, 720.

When the receiver in the second wireless communication device 122 is capable of receiving a signal modulated using a spread spectrum technique, the first wireless communication device 121 may re-map the chip sequence to bits by differential encoding and bit alternating, and provide the bits from the re-mapping unit 450, 750 to the GMSK modulator 420, 720.

When the receiver in the second wireless communication device 122 is capable of receiving a GMSK signal, the first wireless communication device 121 may provide the bits with the selected data rate directly to the GMSK modulator 420.

When the receiver in the second wireless communication device 122 is capable of receiving a GMSK signal, the method may further comprise differential encoding the bits received from the rate selector in a differential encoder 760 and generating bits to the GMSK modulator 720.

Action 904b

If the transmitter 300, 600 comprises an O-QPSK modulator 320, 620, the first wireless communication device 121 re-maps in a re-mapping unit 350, 650 the bits received from the rate selector 310, 610 to produce signals for providing to the modulator 320, 620.

When the receiver in the second wireless communication device 122 is capable of receiving a GMSK signal, the first wireless communication device 121 may re-map the bits received from the rate selector 310, 610 by applying a differential code and bit alternation to the bits depending on the capabilities of the receiver and re-map the bits to antipodal binary symbols, and provide the antipodal binary symbols to the modulator 320, 620.

According to some embodiments, the method may further comprising filtering an output of the modulator 620 in order to match spectral characteristics of a modulated signal from the transmitter 600 to spectral characteristics of the GMSK signals supported by the receiver.

When the receiver in the second wireless communication device 122 is capable of receiving a signal modulated using a spread spectrum technique, the chip sequence generated in the spreading unit by Action 903 may be provided to the modulator 320, 620, e.g. an O-QPSK modulator.

Figure 10:
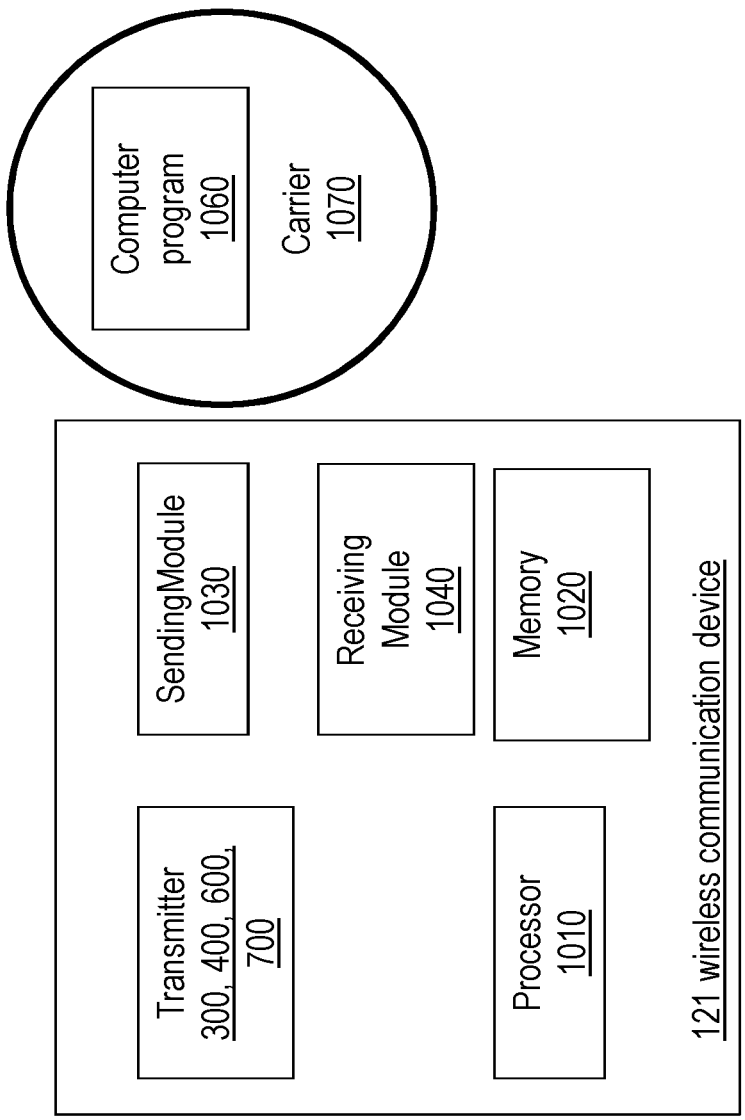
FIG. 10 is a schematic block diagram depicting a wireless communication device according to embodiments herein.

FIG. 10 is a schematic block diagram depicting the wireless communication device 121 comprising the transmitter 300, 400, 600, 700.

The embodiments herein may be implemented through one or more processors, such as a processing unit 1010 in the wireless communication device 121 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the wireless communication device 121. One such carrier may be in the form of a CD ROM disc. It is however feasible with other data carriers such as a memory stick. The computer program code may furthermore be provided as pure program code on a server and downloaded to the wireless communication device 121.

The wireless communication device 121 may further comprise a memory 1020 comprising one or more memory units. The memory comprises instructions executable by the processing unit 1010. The memory 1020 is arranged to be used to store e.g. assignments, information, data, configurations, etc. to perform the methods herein when being executed in the wireless communication device 121.

In some embodiments, a computer program 1060 comprises instructions, which when executed by the at least one processor such as the processing unit 1010, cause the at least one processing unit to perform actions according to actions above.

In some embodiments, a carrier 1070 comprises the computer program 1060, wherein the carrier 1070 is one of an electronic signal, an optical signal, an electromagnetic signal, a magnetic signal, an electric signal, a radio signal, a microwave signal, or a computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

Abbreviation Explanation

IoT Internet of Things
M2M Machine to Machine
MSK Minimum Shift Keying
GMSK Gaussian MSK
O-QPSK Offset Quadrature Phase Shift Keying
BLE Bluetooth Low Energy
HW HardWare
TX Transmitter
RX Receiver
PHY Physical/Physical layer
DSSS Direct Sequency Spread Spectrum
ISM Industrial Scientific Medical
LBT Listen Before Talk
ISI Inter Symbol Interference

The invention claimed is:

1. A transmitter in a first wireless communication device, the transmitter comprising:
   a Gaussian Minimum Shift Keying (GMSK) modulator;
   a rate selector configured to select a data rate, wherein the rate selector comprises an input configured to receive input bits and an output to provide the bits with the selected data rate;
   a bit to symbol mapper configured to receive the bits from the rate selector and map the bits to symbols of an arbitrary alphabet;
   a spreading unit configured to spread the symbols received from the bit to symbol mapper to a chip sequence by means of a spreading code; and
   a re-mapping unit configured to map the chip sequence received from the spreading unit to produce signals for providing to the GMSK modulator.

2. The transmitter of claim 1, wherein the rate selector is configured to select the data rate depending on capabilities of a receiver in a second wireless communication device, and wherein the capabilities of the receiver in the second wireless communication device comprises at least one of:
   a) support for spread spectrum modulation;
   b) support for differential decoding and a type of differential code;
   c) support for MSK modulation;
   d) support for GMSK modulation.

3. The transmitter of claim 1, wherein the re-mapping unit is a chip re-mapper configured to map the chip sequence back to bits to produce the signals to the GMSK modulator.

4. The transmitter of claim 3, wherein when the receiver in the second wireless communication device is capable of receiving a signal modulated using a spread spectrum technique, the rate selector is configured to select one data rate compatible with the data rate supported by the receiver, and wherein the re-mapping unit comprises at least one of a differential encoder and a bit alternation unit and is configured to map the chip sequence to bits to produce the signals to the GMSK modulator.

5. The transmitter of claim 2, wherein when the receiver in the second wireless communication device is capable of receiving a GMSK signal, and the rate selector is configured to select one data rate compatible with the data rate supported by the receiver, and provide the bits with the selected data rate directly to the GMSK modulator.

6. The transmitter of claim 2, when the receiver in the second wireless communication device is capable of receiving a GMSK signal, and the rate selector is configured to select one data rate compatible with the data rate supported by the receiver, and wherein the transmitter further comprises a differential encoder configured to receive the bits from the rate selector and generate bits to the GMSK modulator, wherein the differential encoder is configured to match a code used by the receiver supporting differential decoding.

7. The transmitter of claim 2, when the receiver in the second wireless communication device is capable of receiving both GMSK signals and signals modulated using a spread spectrum technique, the data rate selector is configured to select any data rate compatible with the data rates supported by the receiver by means of either a rate adaptation algorithm or a pre-determined fixed choice.

8. The transmitter of claim 1, being implemented digitally by means of firmware upgrades.

9. A wireless communication device comprising a transmitter of claim 1.

10. A transmitter in a first wireless communication device, the transmitter comprising:
   a modulator;
   a rate selector configured to select a data rate, wherein the rate selector comprises an input configured to receive input bits and an output to provide the bits with the selected data rate;
   a bit to symbol mapper configured to receive the bits from the rate selector and map the bits to symbols of an arbitrary alphabet;
   a spreading unit configured to spread the symbols received from the bit to symbol mapper to a chip sequence by means of a spreading code for providing to the modulator; and
   a re-mapping unit configured to map the bits received from the rate selector to produce signals for providing to the modulator.

11. The transmitter of claim 10, wherein the rate selector is configured to select the data rate depending on capabilities of a receiver in a second wireless communication device, and wherein the capabilities of the receiver in the second wireless communication device comprises at least one of:
   a) support for spread spectrum modulation;
   b) support for differential decoding and a type of differential code;
   c) support for Minimum Shift Keying (MSK) modulation;
   d) support for Gaussian Minimum Shift Keying (GMSK) modulation.

12. The transmitter of claim 10, wherein when the receiver in the second wireless communication device is capable of receiving Gaussian Minimum Shift Keying (GMSK) signals, and the rate selector is configured to select one data rate compatible with the data rate supported by the receiver, the re-mapping unit is configured to apply a differential code and bit alternation depending on the capabilities of the receiver and the bits are re-mapped to antipodal binary symbols to provide signals to the modulator.

13. The transmitter of claim 12, further comprising a filter applied to an output of the modulator in order to match spectral characteristics of a modulated signal from the transmitter to spectral characteristics of the GMSK signals supported by the receiver in the second wireless communication device.

14. The transmitter of claim 10, wherein the modulator is a Offset Quadrature Phase Shift Keying (O-QPSK) modulator.

15. The transmitter of claim 10, wherein when the receiver in the second wireless communication device is capable of receiving a signal modulated using a spread spectrum technique, the rate selector is configured to select one data rate compatible with the data rate supported by the receiver, and wherein the spreading unit is configured to provide signals to the O-QPSK modulator.

16. The transmitter of claim 11, when the receiver in the second wireless communication device is capable of receiving both GMSK signals and signals modulated using a spread spectrum technique, the data rate selector is configured to select any data rate compatible with the data rates supported by the receiver in the second wireless communication device by means of either a rate adaptation algorithm or a pre-determined fixed choice.

17. A method in a transmitter in a first wireless communication device comprising:
   selecting a data rate depending on capabilities of a receiver in a second wireless communication device to provide bits with the selected data rate;
   mapping the bits having the selected data rate to symbols of an arbitrary alphabet;
   using a spreading code to spread the symbols to a chip sequence; and
   re-mapping the chip sequence to produce signals for providing to a Gaussian Minimum Shift Keying (GMSK) modulator.

18. The method of claim 17, when the receiver in the second wireless communication device is capable of receiving a signal modulated using a spread spectrum technique, selecting a data rate compatible with the data rate supported by the receiver, wherein re-mapping the chip sequence comprises mapping the chip sequence to bits by differential encoding and bit alternating, and the method further comprises providing the bits to the GMSK modulator.

19. The method of claim 17, when the receiver in the second wireless communication device is capable of receiving a GMSK signal, selecting a data rate compatible with the data rate supported by the receiver, and the method further comprises providing the bits with the selected data rate directly to the GMSK modulator.

20. The method of claim 17, when the receiver in the second wireless communication device is capable of receiving a GMSK signal, selecting a data rate compatible with the data rate supported by the receiver, and the method further comprises differential encoding the bits and generating bits to the GMSK modulator.

21. A method in a transmitter in a first wireless communication device comprising:
   selecting a data rate depending on capabilities of a receiver in a second wireless communication device to provide bits with the selected data rate;
   mapping the bits having the selected data rate to symbols of an arbitrary alphabet;
   using a spreading code to spread the symbols to a chip sequence for providing to a modulator; and
   re-mapping the bits having the selected data rate to produce signals for providing to the modulator.

22. The method of claim 21, when the receiver in the second wireless communication device is capable of receiving Gaussian Minimum Shift Keying (GMSK) signals, selecting a data rate compatible with the data rate supported by the receiver, wherein re-mapping the bits comprises applying a differential code and bit alternation to the bits depending on the capabilities of the receiver and re-mapping the bits to antipodal binary symbols, and the method further comprises providing the antipodal binary symbols to the modulator.

23. The method of claim 22, further comprising filtering an output of the modulator in order to match spectral characteristics of a modulated signal from the transmitter to spectral characteristics of the GMSK signals supported by the receiver.

24. The method of claim 21, when the receiver in the second wireless communication device is capable of receiving a signal modulated using a spread spectrum technique, selecting a data rate compatible with the data rate supported by the receiver, and the method further comprises providing the chip sequence to an Offset Quadrature Phase Shift Keying (O-QPSK) modulator.

* * * * *